United States Patent [19]
Yohda et al.

[11] Patent Number: 4,985,797
[45] Date of Patent: Jan. 15, 1991

[54] MAGNETIC HEAD

[75] Inventors: Hiroshi Yohda, Hirakata; Yasushi Inoue, Neyagawa, both of Japan

[73] Assignee: Matsushita Electric Industrial Co., Ltd., Osaka, Japan

[21] Appl. No.: 326,042

[22] Filed: Mar. 17, 1989

[30] Foreign Application Priority Data

Mar. 23, 1988 [JP] Japan ................................. 63-68590

[51] Int. Cl.⁵ ............................................. G11B 5/147
[52] U.S. Cl. ..................................... 360/126; 360/125
[58] Field of Search ........................ 360/122, 125–127, 360/128

[56] References Cited

U.S. PATENT DOCUMENTS 4,608,297  8/1986  Shimada .......................... 360/125 X Primary Examiner—A. J. Heinz
Attorney, Agent, or Firm—Wenderoth, Lind & Ponack

[57] ABSTRACT

A ring-shaped magnetic head includes magnetic cores made of a metallic magnetic material having a gap therebetween and being held between non-magnetic substrates. A metallic thin film is provided bridging the gap between the magnetic cores for establishing an electrical connection between the magnetic cores. The metallic thin film is formed on a surface of the magnetic head which is opposite to a surface for contacting a magnetic recording medium.

2 Claims, 2 Drawing Sheets

MAGNETIC HEAD

BACKGROUND OF THE INVENTION

1. Field of the Invention

This invention relates to a magnetic head, and more particularly, to a ring-shaped magnetic head, having a metal magnetic core, for recording and reproducing signals efficiently and for preventing electrostatic noise thereof.

2. Description of the Related Art

Recently, systems handling signals in a wide band, such as high definition VTR (Video Tape Recorder) and digital VTR, have been intensively developed. In this situation, the recording medium is enhanced in density so as to be capable of recording a large quantity of information, and the iron oxide compounds are being replaced by alloy powder, metal evaporated film, and other recording media having a higher coercive force. By contrast, the ferrite magnetic head for recording and reproducing signals on a recording medium has a maximum saturated magnetic flux density of only about 5,000 gauss, and the pole tip is saturated in the recording of the high coercive medium with Hc of 1,000 Oe or more as mentioned above, and sufficient recording is therefore impossible. Accordingly, a ring-shaped magnetic head structured as shown in FIG. 1 using metal magnetic material such as sendust and amorphous magnetic alloy having a high maximum magnetic flux density has been developed. In this structure, a metal magnetic core 200 is held by a nonmagnetic substrates 100.

In a thus composed magnetic head, when the nonmagnetic substrates 100 holding the metal magnetic core 200 are insulators, spotty noise may be formed on the reproduced image of the VTR. Such noise is also experienced in a ferrite head. The cause of such noise is considered to be due to discharge generated on the head surface due to electrostatic charge with the tape, and it was believed to be sliding by grounding the magnetic core so as to allow this electric charge to escape. In the Japanese Utility Model Publication No. 52-41377 is disclosed a head structure capable of preventing such noise by adhering the magnetic core to the head base with a conductive adhesive and grounding the magnetic core electrically. However, the adhesion of the conductive adhesive is weak as compared with that of general adhesives, and the reliability of adhesion tends to be inferior, and when the entire magnetic head is not conductive, such as the magnetic head in a structure in which the metal magnetic core is held by a ceramic substrate, if the metal magnetic core is thin, conduction may not be always obtained perfectly depending on the size of the conductive particles of the conductive adhesive. Alternately, in the case of a magnetic head mounted on an insulating ceramic head base such as dynamic tracking head using a piezoelectric element, it is necessary to wind around the conductor in order to ground the magnetic core, which results in a complicated structure.

SUMMARY OF THE INVENTION

In order to solve the above-discussed problems, this invention is intended to present a magnetic head having a pair of magnetic cores which are disposed opposedly across a gap and which conduct with each other electrically.

That is, the present inventors have discovered that the electrostatic noise is caused, not by the discharged of the electric charge accumulated on the head surface into other parts, but by the discharge generated across the gap due to the potential difference derived from the difference in the quantity of electric charge charged in a pair of magnetic cores opposing each other through a nonmagnetic gap film such as $SiO_2$ and glass. It is hence found that, to prevent this noise, it is sufficient to eliminate the potential difference between a pair of magnetic cores by electrically connecting them together, without having to ground the magnetic cores. Therefore, when the head is designed so that a pair of magnetic cores may conduct electrically, it is possible to prevent generation of noise using the magnetic head alone, and it is necessary neither to connect to the magnetic head base with conductive adhesive, nor to ground by wiring about the conductor if disposed on an insulating head substrate.

While the novel features of the invention are set forth in the appended claims, the invention, both as to organization and content, will be better understood and appreciated, along with other objects and features thereof, from the following detailed description of the invention taken in conjunction with the drawings.

DETAILED DESCRIPTION OF THE INVENTION

Figure 1:
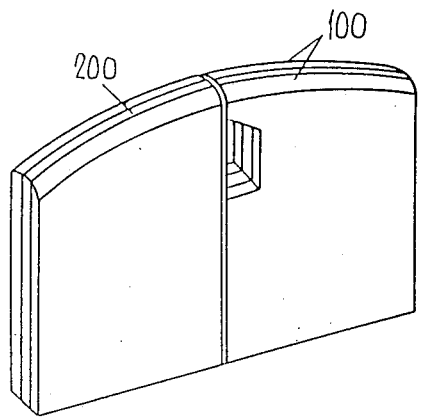
FIG. 1 is a perspective view of a conventional magnetic head.
Figure 2:
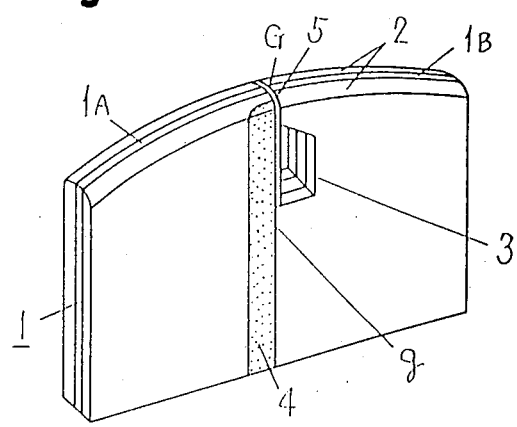
FIG. 2 is a perspective view of a first embodiment of a magnetic head in this invention.

A perspective view of a first embodiment of the present invention is shown in FIG. 2, in which number 1 denotes a magnetic core made of a thin sheet of a metal magnetic film, such as Co amorphous alloy and sendust. The magnetic core 1 is held in place by nonmagnetic substrates 2 made of calcium titanate ceramics or the like. The magnetic core 1 is separated into a pair of magnetic cores 1A, 1B. The upper portions of the magnetic cores 1A, 1B are opposed to each other through a nonmagnetic gap film in a portion of a front magnetic gap G, and the lower portions of the magnetic cores 1A, 1B contact with each other directly and are joined together by bonding glass 4. That is, the pair of magnetic cores 1A, 1B contact each other directly at a rear magnetic gap g as shown so as to conduct, and when they are placed on an insulating head base, such as a ceramic head base, noise is not generated even if the magnetic head is not grounded. Incidentally, numeral 3 denotes a winding window.

Figure 3:
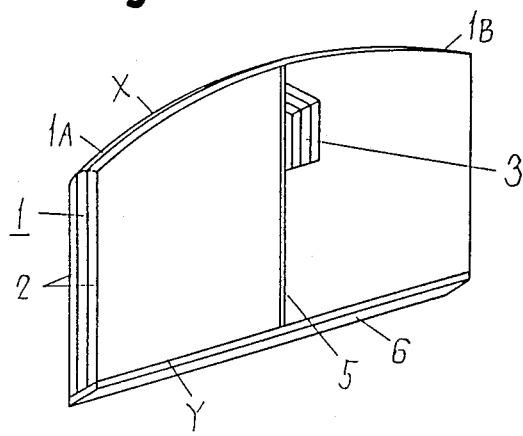
FIG. 3 is a perspective view of a second embodiment of a magnetic head of the invention.

A perspective view of a second embodiment of the present invention is shown in FIG. 3. In the magnetic head according to this embodiment, the two magnetic cores 1A, 1B oppose each other across a magnetic gap and conduction therebetween is established a conductive thin film 6, such as Cr and Cu, formed on a plane Y, opposite to a magnetic recording medium and opposing plane X of the magnetic head. In this case, the pair of magnetic cores 1A, 1B do not contact each other directly, but are instead separated by a nonmagnetic gap film 5.

Figure 4:
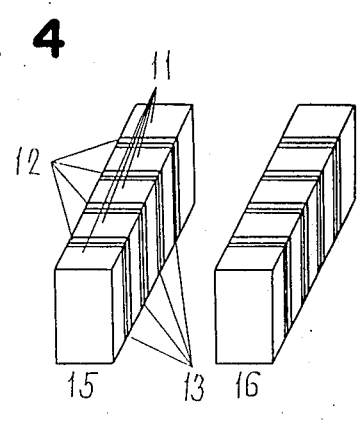
FIG. 4 and FIG. 5 are perspective views showing the manufacturing method of the magnetic head in an embodiment of the invention.
Figure 5:
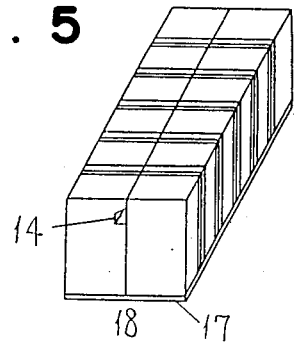

The manufacturing method of such a magnetic head is explained below with reference to FIGS. 4 and 5. A metal magnetic film 12 is first formed on a nonmagnetic substrate 11 by sputtering, and a plurality thereof are laminated and adhered using crystallized glass 13 or the like. A pair of core blocks 15, 16 are then fabricated having the metal magnetic film and nonmagnetic substrate laminated alternately. One of the pair of core blocks is a C-shaped core block forming a winding window 14, while the other is formed as an I-shaped core block. Afterwards, the gap faces of both core blocks are polished to a mirror-smooth surface, and a nonmagnetic thin film of glass or the like is formed to a specified film thickness and is joined and adhered using bonding glass. A metal thin film of Cr or the like having a thickness of about 1 μm is formed on the side of the core block which is opposite the magnetic recording medium sliding face by a proper method, such as sputtering and evaporation, thereby obtaining a core block 18 as shown. Later, the core block 18 is cut to a specified thickness, and the front side is taped lapped, whereby manufacture of the magnetic head as shown in FIG. 3 is complete.

Another embodiment of the magnetic head manufacturing method of this invention is explained below. In the same manner as in the first embodiment of the manufacturing method, an I-shaped core and a C-shaped core are adhered through a magnetic gap, and a core block is formed. Then, through the magnetic gap, a voltage is applied between the opposing magnetic cores, and the insulation of the magnetic gap film is broken down. In this case, the voltage to be applied is about 100 V, when the gap length is, for example, 0.3 μm. When the current during insulation breakdown is adjusted, the resistance between the two cores will drop from infinity to less than several kilo-ohms. To connect the metal magnetic core and the lead wire for passing current, when the magnetic cores are held by conductive resin from both sides, many magnetic head cores may be easily processed.

According to this invention, the noise resulting from the electrostatics generated due to sliding with the recording medium may be prevented by the magnetic head alone, without requiring a conductive adhesive for linking between the magnetic head and magnetic head base or a grounding conductor in the case where the magnetic head is placed on an insulating magnetic head base, so that excellent reliability is obtained using a simple structure. Furthermore, according to the manufacturing method of this invention, since the electrical connection between two cores can be achieved in a laminated state of multiple head chips during manufacture of the head, the number of processing steps for manufacture may not be increased.

While specific embodiments of the invention have been illustrated and described herein, it is noted that other modifications and changes will occur to those skilled in the art. It is therefore to be understood that the appended claims are intended to cover all modifications and changes a fall within the true spirit and scope of the invention.

We claim:

1. In a ring-shaped magnetic head in which magnetic cores made of a metallic magnetic material are held between non-magnetic substrates, the improvement comprising a metallic thin film bridging the magnetic cores for establishing an electrical connection between the magnetic cores, the metallic thin film being formed on a surface of the magnetic head which is opposite to a surface for contacting a magnetic recording medium.

2. A ring-shaped magnetic head comprising:
   first and second metallic magnetic cores each having opposite planar surfaces, said first and second metallic magnetic cores extending in a same first plane and defining a substantially constant gap therebetween, said gap having first and second ends;
   a plurality of non-magnetic substrates respectively disposed along said opposite planar surfaces of said first and second metallic magnetic cores;
   a winding window formed at said gap in one of said first and second metallic magnetic cores in proximity to said first end of said gap; and,
   a metallic thin film connected to said plurality of non-magnetic substrates and to said first and second metallic magnetic cores, said metallic thin film extending across said second end of said gap in a second plane which is substantially perpendicular to said first plane.

* * * * *